United States Patent [19]

Calvird, II et al.

[11] Patent Number: 4,956,781
[45] Date of Patent: Sep. 11, 1990

[54] COUNTER DRIVEN RAM ENGINE CONTROL

[75] Inventors: Harry R. Calvird, II, Camarillo; Jimmie R. Siler, Santa Barbara, both of Calif.

[73] Assignee: Delco Electronics Corporation, Kokomo, Ind.

[21] Appl. No.: 310,174

[22] Filed: Feb. 15, 1989

[51] Int. Cl.⁵ .............................................. G06F 15/20
[52] U.S. Cl. .......................... 364/431.04; 364/431.05; 377/20
[58] Field of Search ...................... 364/431.04, 431.05, 364/431.07; 123/480, 486, 488, 416, 417; 377/20

[56] References Cited

U.S. PATENT DOCUMENTS

| | | | |
|---|---|---|---|
| 4,499,544 | 2/1985 | Ohba et al. | 364/431.04 |
| 4,677,558 | 6/1987 | Böhmler et al. | 364/431.04 |
| 4,751,721 | 6/1988 | Wissell | 377/20 |
| 4,862,369 | 8/1989 | Yakuwa et al. | 364/431.07 |

Primary Examiner—Parshotam S. Lall
Assistant Examiner—Tyrone Queen
Attorney, Agent, or Firm—Howard N. Conkey

[57] ABSTRACT

A system provides for controlling various vehicle functions by use of a free-running counter that drives the address lines of a random access memory which are shared with a control microprocessor. The counter represents a clock which directly maps addresses in the RAM to discrete moments in time. Each bit at each RAM memory location describes an on or off control command of a particular function. The microprocessor sets selected bits corresponding to the control function in two address locations corresponding to the on and off points in time so as to enable the generation of a pulse of exact direction for control.

3 Claims, 3 Drawing Sheets

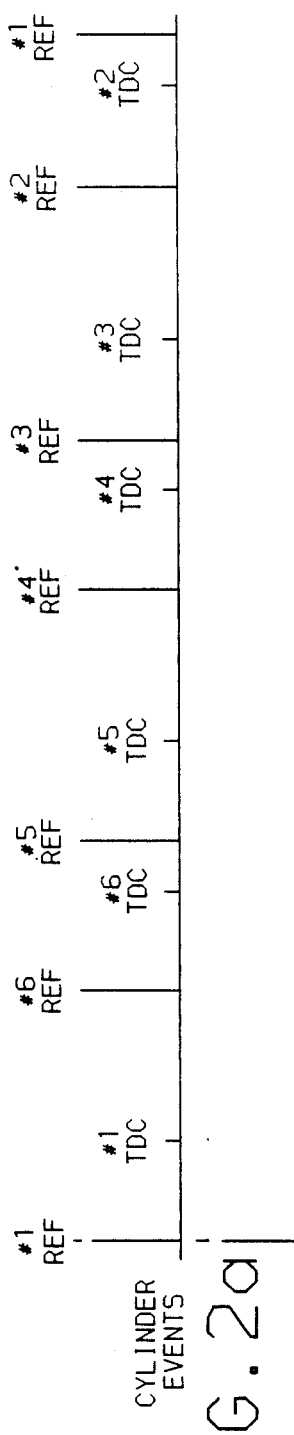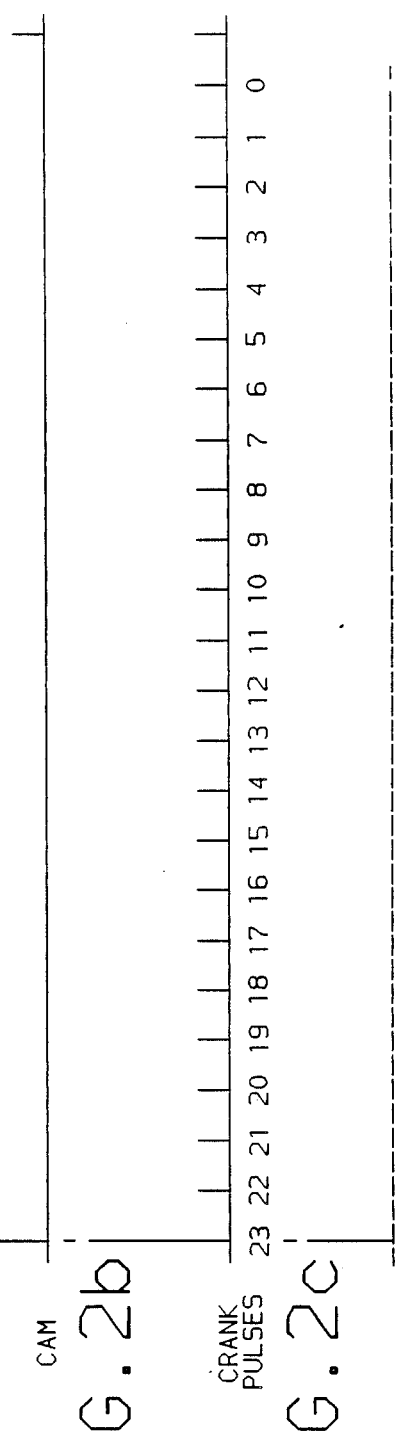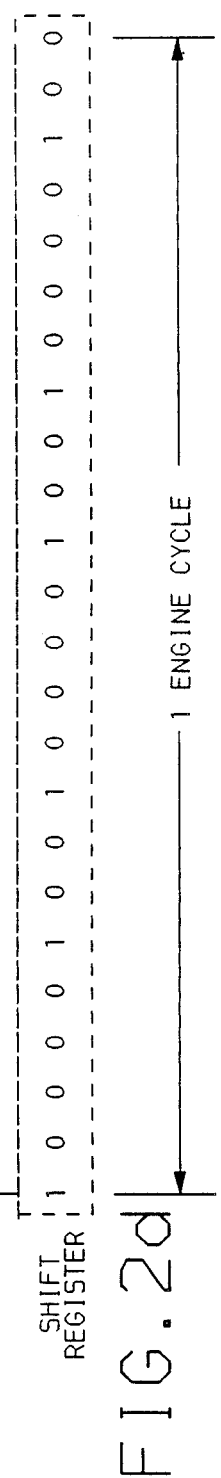
FIG. 2a CYLINDER EVENTS
FIG. 2b CAM
FIG. 2c CRANK PULSES
FIG. 2d SHIFT REGISTER

COUNTER DRIVEN RAM ENGINE CONTROL

BACKGROUND OF THE INVENTION

This invention relates to an apparatus and method for controlling multiple functions of an internal combustion engine.

The number of functions electronically controlled in a motor vehicle are significantly increasing. With this increase is a significant increase in the complexity of the controllers for controlling those functions. In order to provide for the control of these large numbers of functions, current systems typically include or use either a single microprocessor with several custom integrated circuits or multiple processors, each of which is costly. It would therefore be desirable to reduce the complexity of these control systems while yet retaining the ability to control the large number of functions on the vehicle.

A significant number of the functions on a vehicle are controlled by timed pulses. For example, one such function is the control of the fuel injectors of the vehicle engine by application of a timed pulse for establishing the desired injected quantity of fuel. Additional functions controlled by this form of discrete signal include spark timing, transmission control and exhaust gas recirculation control.

SUMMARY OF THE INVENTION

This invention provides for decreasing the complexity and cost of motor vehicle controllers by an improved system and apparatus for controlling the functions on a vehicle controlled by timed pulses. While having less complexity, the controller of this invention yet has the capacity to control very accurately a large number of functions.

In general, this invention provides for the generation of timed pulses for controlling vehicle functions by the use of a free running counter that drives the address lines of a random access memory (RAM) which are shared with the microprocessor. The counter represents a clock which directly maps addresses in the RAM to discrete moments in time. Stated in another way, the free running counter maps out sequential time slots. By addressing the RAM by the counter output, the counter output maps the memory locations into sequential predictable time slots spaced at time intervals determined by the counting frequency of the counter.

Each bit at each RAM memory location can describe an on or off command of a particular function or element. By clocking the bit states at each memory address into a flip flop, the microprocessor then only has to set the bit to control the corresponding function in two address locations corresponding to the on and off points in time to generate a pulse of exact duration. The number of output devices that can be controlled is equal to the bit width of the RAM. For example, an 8 bit RAM can be utilized to control the timed injection in 8 fuel injectors of an engine.

A significant feature of this invention is its flexibility for applications. Any number of simultaneous events up to the bit width of the RAM can be controlled with no loss of precision. By using a wider memory (such as a 16 bit wide memory as opposed to an 8 bit wide memory) more events can be controlled simultaneously. On the other hand, by using a deeper memory (such as an 8k memory instead of a 1k memory) either the overall cycle time (the time between accessing any given address) can be lengthened or the resolution can be improved by utilizing a faster clock for clocking the free running counter. In addition to fuel control, other functions, such as spark timing and dwell or stepper motor control, can be controlled with this scheme simply by adding and/or allocating RAM memory to that function.

DESCRIPTION OF THE DRAWINGS

The invention may be best understood by reference to the following description of a preferred embodiment and the drawings in which:

FIG. 2, consisting of A-D, is a timing diagram illustrating the generation of the cylinder reference pulses in the system of FIG. 1;

DESCRIPTION OF A PREFERRED EMBODIMENT

Figure 1:
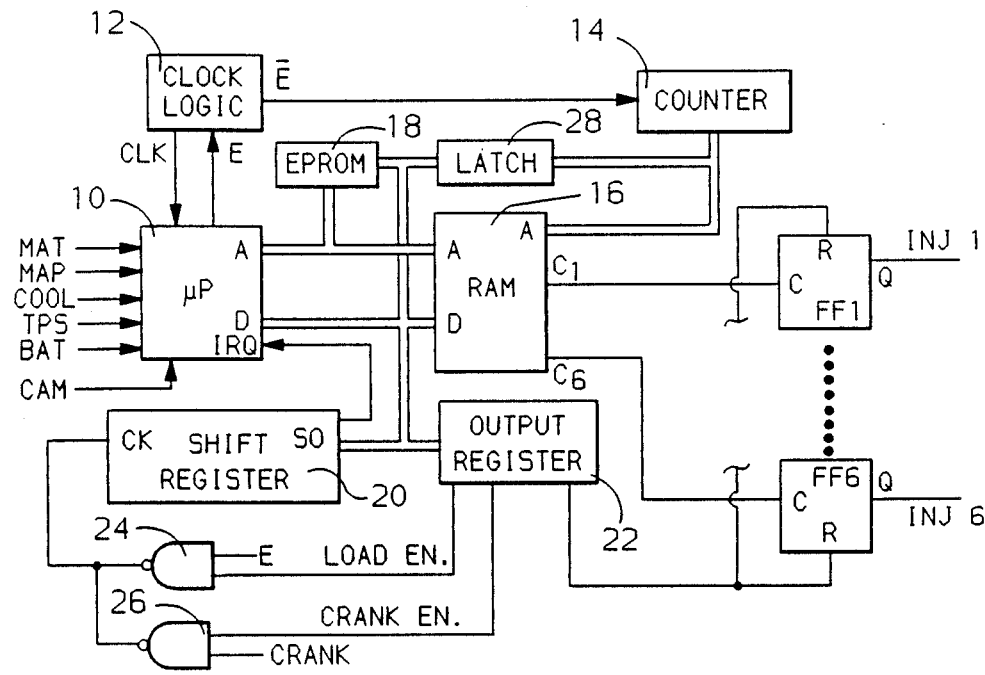
FIG. 1 is a control system for controlling the fuel injectors of an internal combustion engine in accord with the principles of this invention.

Referring to FIG. 1, there is illustrated a system for controlling the standard fuel injectors (not illustrated) of a port injected 6 cylinder internal combustion engine. In general, the injectors are sequentially controlled in timed relation to engine rotation.

A standard microprocessor 10, which may take the form of a Motorola single chip microprocessor MC68HC11, receives a high frequency clock signal CLK such as from a crystal oscillator in a clock circuit logic 12 and generates a squarewave clock signal E (which may be at ¼ the frequency of the clock signal CLK). The clock signal E is used for timing of the operation of the microprocessor 10 and is also provided to the clock logic circuit 12 which inverts the clock signal E to provide the inverted clock signal $\overline{E}$.

A counter 14 is clocked by the inverted clock signal $\overline{E}$ and functions as a free running counter whose count is representative of the present point in time. The count in the counter representing a future point in time relative to the present time or relative to any other point in time represented by a particular counter count can be determined based on the known frequency of the clock signal $\overline{E}$. The output of the counter 14 is provided to the address inputs of a dual port RAM 16 which is addressed by the count of the counter 14.

Since the count in the counter represents particular points in time, or specific time slots, the addressing of the RAM 16 by the count in the counter directly maps the RAM addresses into sequential predictable moments in time. These sequential moments in time or time slots are spaced at time intervals determined by the frequency of the clock signal E. Therefore, relative to any given count in the counter 14 representing a particular time slot, the RAM address associated with a future point in time can be determined.

In the present embodiment, the RAM 16 takes the form of an 8 bit RAM so that 8 individual control functions may be performed, each function being associated with a bit in each of the address locations. In this embodiment, 6 of the bits of the 8 bit RAM are utilized to control the injection of fuel to the cylinders of an internal combustion engine. The output lines C1 through C6 of the RAM 16 corresponding to those bits 1 through 6 are provided to the clock inputs of respective flip flops FF1 through FF6. The Q outputs of the flip flops FF1 through FF6 are in turn provided to conventional electromagnetic fuel injectors, INJ1 through INJ6. Each fuel injector is energized to inject fuel to the engine when the respective flip flop Q output is at a one logic level and is deenergized when the Q output of the flip flop is at a zero logic level. Therefore, by toggling the flip flops at predetermined points in time, the timing of injection and the duration of injection to the injectors may be controlled. For example, in regard to injector INJ1, when a memory location in the RAM 16 is addressed at which bit 1 coupled to the output line C1 is at a logic 1 state, the flip flop FF1 is clocked to shift its Q output to a logic 1 level to energize injector INJ1 and initiate injection of fuel. Subsequently, when the next RAM location is addressed at which the bit 1 coupled to the C1 output is at a logic 1 state, the flip flop 1 is again clocked to shift its output to a logic 0 to terminate fuel injection by the injector INJ1. Similarly, by controlling the states of the bits 2 through 6 corresponding to the data output line C2 through C6, the fuel injectors INJ1 thru INJ6 may be controlled.

In general, the timing of injection is accomplished by the microprocessor 10 by controlling the bit states at memory locations addressed by the counter 14 at predetermined points in time. The microprocessor 10 accomplishes this function b execution of a program permanently stored in an EPROM 18.

In order to synchronize the microprocessor 10 to engine rotation and to enable the timing of the injection of fuel to the cylinders of the engine, a conventional cam sensor (not illustrated) is used to establish the beginning of each engine cycle and crank reference pulses are provided at predetermined angular rotational intervals of the engine to provide engine rotational information. The crank reference pulses provided to the microprocessor 10 may be generated by a toothed wheel rotated by the engine and an electromagnetic sensor for sensing the passing of the teeth. In this embodiment, a 12 tooth wheel is provided which translates to 24 crank reference pulses for each engine cycle.

To enable the microprocessor to identify particular cylinder events associated with engine rotation, a shift register 20 is provided having 24 stages corresponding to the number of crank reference pulses provided with each engine cycle. In general, during engine rotation, each engine cycle is initialized upon receipt of the CAM reference pulse. The microprocessor functions upon receipt of the CAM reference pulse to preset the shift register 20 so that the output of its last stage shifts to a 1 bit at a predetermined angle before top dead center of each cylinder as it is clocked by the reference pulses. This synchronization with engine rotation is illustrated in FIG. 2. The CAM pulse is illustrated as being generated at the beginning of each engine cycle with 24 crank pulses being provided with each engine cycle. Upon the generation of a CAM pulse, the 24 stages of the shift register are preset as illustrated in FIG. 2 such that as the shift register is clocked by the crank pulses, the output of its last stage corresponds to the reference pulses at a predetermined angle before top dead center position of each cylinder.

The initial condition of the shift register is preset to cylinder events of the particular engine. The illustration of FIG. 2 is provided for a 90′ odd-fire V6 internal combustion engine. It is apparent that for other engines, the bits set to a one state in the shift register may be varied according to the engine so as to provide the reference pulse output to the microprocessor 10 at the desired predetermined angle before top dead center. It is further apparent from the illustration of FIG. 2 that with the knowledge of the cylinder sequence, upon the generation of the CAM signal, each reference pulse is identified with a particular engine cylinder and therefore fuel injector INJ1 thru INJ6.

An output register 22 is provided through which the microprocessor controls various functions including the initialization of the flip flops FF1 thru FF6 when the power is first applied to the circuit of FIG. 1 and to provide for initialization of the shift register 20. In this regard, the microprocessor initializes the flip flops FF1 through FF6 via the output register 22 by applying reset signals to the reset inputs of the flip flops. Additionally, a load enable signal is provided to a NAND gate 24 to enable the clock signal E to clock the desired initial states of the shift register stages 20 provided by the microprocessor 10 on the data bus into the respective shift register stages. During this initialization period, crank pulses are disabled by the microprocessor 10 by the provision of a crank enable signal to a NAND gate 26 via the output register 22. For example, while initializing the shift register 20, the crank enable signal is at a logic one state to prevent the crank pulses from clocking the shift register 20. Following initialization, the gate 24 is disabled and the gate 26 is enabled to allow crank pulses to clock the shift register as the engine rotates to provide the reference pulses to the microprocessor at the predetermined angle before top dead center of each cylinder.

The current time slot represented by the state of the free-running counter 14 is determined by the microprocessor 10 by latching the output state of the counter on the address bus of the RAM 16 into a latch 28 which can then be read by the microprocessor on the data bus. The microprocessor 10 can then utilize the knowledge of the present time represented by the count of the counter 14 to preset the appropriate memory locations in the RAM 16 for achieving timing and duration of fuel injection.

In order to establish pulse duration for the fuel injectors, the microprocessor monitors various engine conditions including manifold air temperature, manifold absolute pressure, engine coolant temperature, and the position of the throttle.

Figure 3A:
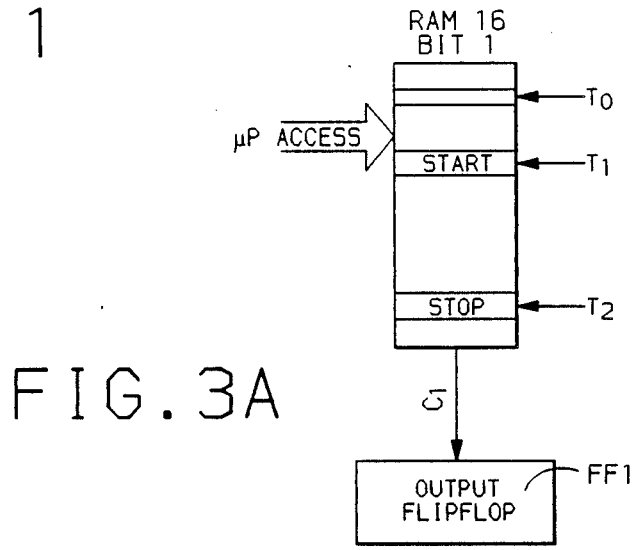
FIGS. 3A and 3B are timing diagrams illustrating the sequential time slots associated with a selected bit in each memory location in the RAM and the generation of a timed pulse thereby.
Figure 3B:
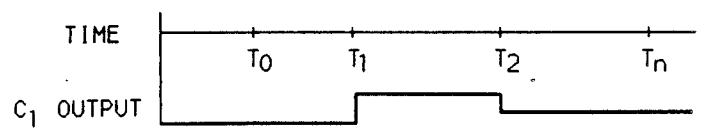

The operation of the system of FIG. 1 for controlling the fuel injectors of the engine is illustrated in the diagram of FIG. 3A. This diagram illustrates a single bit at sequential memory location in the RAM 16 as addressed by the counter 18. The bit illustrated is bit 1 of the RAM memory locations the logic level of which is provided to the output data line C1. This output clocks the flip flop FF1 to control the fuel injector INJ1. It is understood that each memory location contains 8 of the bit memories depicted in FIG. 3 having the capability of controlling 8 separate functions.

As previously described and as depicted in FIG. 3A, the counter 18 maps the bit 1 in each of the memory locations in the RAM 16 into sequential predictable time slots. At time T0, the microprocessor 10 senses the reference signal provided by the shift register 20. This reference signal is the first signal provided following the generation of the CAM signal and therefore indicates a predetermined angle before top dead center of the cylinder corresponding to the fuel injector INJ1. The time slot at which the reference pulse occurred and which is identified as time T0 is determined by the microprocessor by sampling the output of the counter 14 addressing the RAM 16 via the latch 28. Relative to this time, the computer determines the future time slot occurring at time T1 represented by the free-running counter 14 output at which the injector INJ1 is to be energized to initiate fuel injection. The microprocessor 10 then accesses the memory location that will be addressed by the counter output at time T1 and sets bit 1 therein to a logic 1 level for initiating fuel injection.

The duration of fuel injection is dependent upon factors including engine coolant, manifold absolute pressure, manifold air temperature, and throttle position. Based on these parameters, the duration of fuel injection in order to achieve a desired air/fuel ratio is computed. From the computed time, the microprocessor 10 determines the future time slot occurring at time T2 in terms of the count of the free-running counter 14. The microprocessor 10 then accesses the memory location that will be addressed by the counter output at time T2 and sets the bit 1 therein to a logic 1 level for terminating fuel injection. Thereafter, as the free-running counter 14 continues to count to sequentially address the RAM memory locations, when the count in the counter 14 corresponds to the time slot occurring at time T1, the address location illustrated in FIG. 3B previously set for initiating fuel injection is accessed so that the output line C1 shifts to a logic 1 level clocking the flip flop FF1 to initiate injection. As the counter 14 continues to be clocked, the output of the counter addresses the RAM memory location at time T2 previously set to terminate fuel injection on line C1. At this time, the C1 output toggles the flip flop to terminate fuel injection.

The foregoing operation applies for each of the 6 fuel injectors which are controlled independently to achieve fuel metering to the internal combustion engine.

Figure 4:
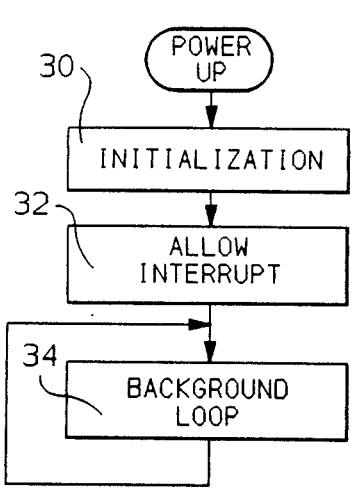
FIGS. 4 and 5 are flow diagrams illustrating the operation of the microprocessor of FIG. 1 in controlling the fuel injectors in accord with the principles of this invention.

The operation of the microprocessor 10 for controlling the fuel injectors INJ1 thru INJ6 will now be described with reference to the flow diagrams of FIGS. 4 and 5. Referring to FIG. 4, when the control system is first powered up such as by operation of the ignition switch of the vehicle, the program executes a routine to provide for system initialization. For example, at this step various flags and counters are initialized. Additionally, at step 30, the flip flops FF1 thru FF6 are reset via the output register 22, the free-running timer is reset, and the shift register 20 is initialized. Upon receipt of the first cam pulse as the engine is cranked, the program allows the crank pulses to be supplied to the shift register to generate the reference pulses as previously described.

After the initialization step 30, the program allows interrupts to occur at step 32. The program then shifts to a background loop 34 which is continuously repeated. This loop may include execution of routines such as diagnostic and warning routines. Upon receipt of a reference pulse from the shift register 20, the microprocessor 10 interrupts the background loop 34 to execute the fuel control routine of FIG. 5 which provides for control of the fuel injectors INJ1 thru INJ6 in accord with the principles of this invention.

Figure 5:
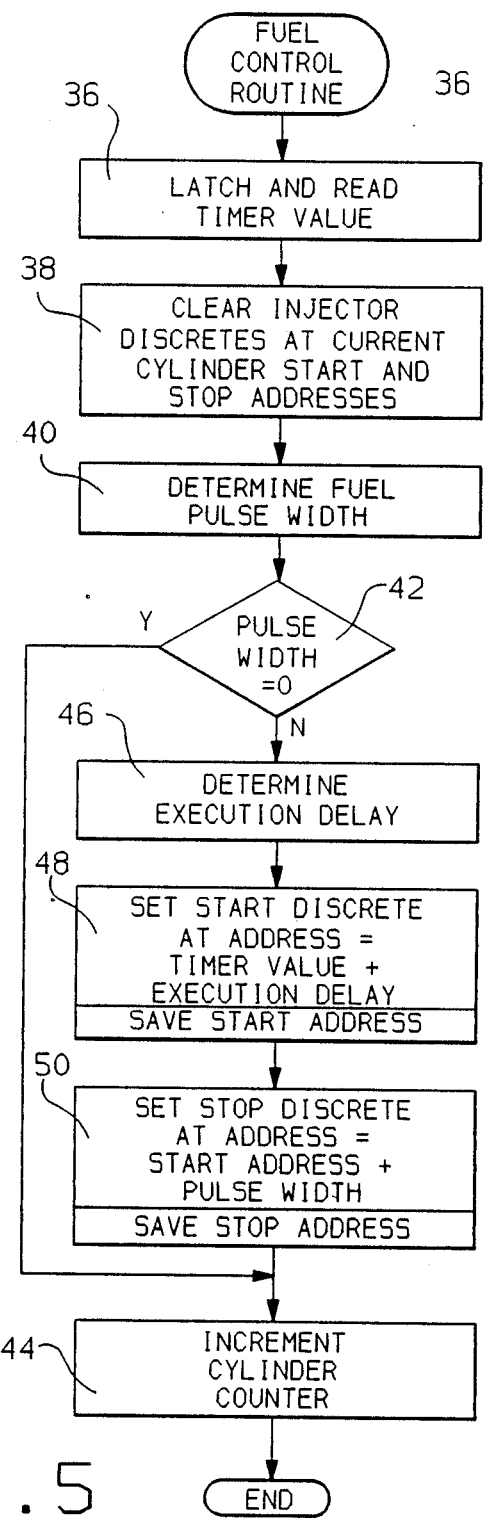

Referring to FIG. 5, when the background loop 34 is interrupted upon receipt of the reference pulse from the shift register 20, the program proceeds from a step 36 to latch and read the address output of the free-running counter 14. This address output represents the time of occurrence of the reference pulse. Thereafter, the program proceeds to a step 38 where the previous discretes controlling the fuel injector corresponding to the cylinder represented by the reference pulse initiating the interrupt are cleared. These discretes represent the initiation and termination of fuel injection during the prior engine cycle contained in the RAM 16 memory locations utilized in that previous cycle for controlling fuel injection.

At step 40, the microprecessor 10 determines the fuel pulse width duration required to achieve a desired air/fuel ratio in response to the various inputs illustrated in FIG. 1. This determination is via conventional routines well known in the art. At step 42, the program determines whether the determined pulse width is equal to zero. If equal to zero indicating no fuel injection is required, the program proceeds directly to a step 44 where a cylinder counter is incremented to point to the next cylinder for which fuel will be injected. This cylinder corresponds to the next reference pulse that will be generated by the shift register 20.

Returning to step 42, if the determined fuel pulse width is greater than zero, the program proceeds to a step 46 where the execution delay from the time read at step 36 is determined. This delay represents the time from the reference pulse at which it is desired to initiate fuel injection and corresponds to T1-T0 in FIG. 3. This execution delay is in terms of counts of the free-running counter 14 taking into consideration the frequency of the clock signal $\overline{E}$.

At step 48, the microprocessor 10 accesses the RAM 16 at the memory location corresponding to the time of the reference pulse read at step 36 plus the execution delay determined at step 46. This start address corresponds to the count of the counter 14 at the future point in time previously determined for initiating fuel injection for the selected fuel injector. This start address is saved to enable the computer to clear the set start discrete when the fuel routine of FIG. 5 is next executed for the corresponding cylinder.

At the next step 50, the computer sets the stop discrete at the bit in the RAM memory location corresponding to a count equal to the start time determined at step 48 plus the width of the fuel pulse in terms of counts of the free-running counter 14. This stop discrete is set at the RAM memory address corresponding to the time slot at T2 of FIG. 3. At this step, the stop address is saved for the reason as described in regard to the start address saved at step 48.

The program next increments the cylinder counter at step 44 to point to the next cylinder corresponding to the next reference pulse generated by the shift register 20, exits the routine and then returns to the background loop 34 until the background loop is next interrupted by the generation of a reference pulse from the shift register 20.

Following the execution of the routine of FIG. 5, the RAM is continually sequentially addressed by the output of the counter as it is clocked by the clock pulse $\overline{E}$. When the counter count addresses the address at which the start discrete was set at step 48, the corresponding output line C1 through C6 shifts to a logic 1 level to clock the corresponding flip flop to initiate fuel injection. Thereafter, as the counter is continually clocked, the address location at which the stop discrete was set at step 50 is generated so that the output on the corresponding output line C1 through C6 again shifts to a logic 1 to clock the corresponding flip flop to terminate fuel injection.

As can be seen from the foregoing, the 6 fuel injectors are controlled via the routine of FIG. 5 to provide for sequential fuel injection. Additional functions may also be controlled by the RAM. For example, by providing a 16 bit RAM, 10 additional functions beyond the six described relating to injection of fuel may be provided. This may include spark timing and other control functions including transmission control. Further, by increasing the depth of the RAM, and increasing the frequency of the clock pulse $\overline{E}$, the resolution in the control of the output may be increased.

The foregoing description of a preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A system for generating a control signal for controlling a predetermined function in timed relationship to the operation of a vehicle engine, the system comprising, in combination:
   a memory having a plurality of addressable memory locations;
   addressing means for (A) generating sequential memory addresses in a predictable sequence and at a predetermined frequency and (B) addressing the memory locations in the memory by the generated sequential memory addresses, the memory providing an output control signal corresponding to a stored digital signal at the addressed memory location;
   means for generating a reference signal representing a predetermined operating condition of the engine; and
   means responsive to the generation of the reference signal for (A) sampling the memory address generated by the addressing means, the sampled memory address representing the time of occurrence $T_0$ of the reference signal, (B) determining a desired delay from the time $T_0$ for controlling the predetermined function, (C) determining the memory address that will be generated by the addressing means at a future point in time spaced from the time $T_0$ by the desired delay, and (D) storing a digital control signal in the memory at the memory location addressed by the determined memory address, whereby the output control signal corresponding to the stored digital control signal will be provided by the memory at a time $T_1$ spaced from the time $T_0$ by the desired delay.

2. A system for generating a control signal for controlling a predetermined function in timed relationship to the operation of a vehicle engine, the system comprising, in combination:
   a memory having a plurality of addressable memory locations;
   clock means for generating clock signals at a predetermined frequency;
   a free running counter clocked by the clock signals and providing a count output that is incremented at the predetermined frequency;
   means for addressing the memory locations in the memory by the count output of the counter, the memory providing an output signal corresponding to a stored digital signal at the addressed memory location;
   means for generating a reference signal representing a predetermined operating condition of the engine; and
   means responsive to the generation of the reference signal for (A) sampling the count output of the counter, the sampled count output representing the time of occurrence $T_0$ of the reference pulse, (B) determining a desired delay in terms of the number of clock signals generated by the clock means from the time $T_0$ for controlling the predetermined function, (C) summing the determined delay with the sampled count to determine the memory location to be addressed by the count output of the counter at a time $T_1$ spaced from the time $T_0$ by the desired delay, and (D) storing a digital control signal in the memory at the determined memory location to be addressed at the time $T_1$, whereby the output control signal corresponding to the stored digital control signal will be provided by the memory at the time $T_1$.

3. A system for energizing a fuel injector of an internal combustion engine in timed relationship to the rotation of the engine, the system comprising, in combination:
   a memory having a plurality of addressable memory locations;
   clock means for generating clock signals at a predetermined frequency;
   a free running counter clocked by the clock signals and providing a count output that is incremented at the predetermined frequency;
   means for addressing the memory locations in the memory by the count output of the counter, the memory providing a control signal in response to a stored digital signal at the addressed memory location;
   means for generating a reference signal at a reference angular position of the engine;
   means responsive to the generation of the reference signal for (A) sampling the count output of the counter, the sampled count output representing the time of occurrence $T_0$ of the reference pulse, (B) determining a desired delay from the time $T_0$ in terms of clock signals generated by the clock means for energizing the fuel injector, (C) summing the determined delay with the sampled count to determine a memory location to be addressed by the count output of the counter at a time $T_1$ spaced from the time $T_0$ by the desired delay, (D) storing a first digital signal in the memory at the determined memory location to be addressed at the time $T_1$, (E) determining a desired injection duration in terms of clock signals generated by the clock means, (F) summing the desired injection duration with the sum of the determined delay and the sampled count to determine a memory location to be addressed by the count output of the counter at a time $T_2$ spaced from the time $T_1$ by the desired injection duration, and (G) storing a second digital signal in the memory at the determined memory to be addressed at the time $T_2$, the memory providing control signals at the times $T_1$ and $T_2$ in response to the first and second digital signals stored therein, and
   injector driver means (A) responsive to the control signal provided by the memory at the time $T_1$ for energizing the fuel injector and (B) responsive to the control signal provided by the memory at the time $T_2$ for deenergizing the fuel injector.

* * * * *